(12) United States Patent
Laermann et al.

(10) Patent No.: US 8,490,383 B2
(45) Date of Patent: Jul. 23, 2013

(54) EXHAUST SYSTEM FOR INTERNAL COMBUSTION ENGINE

(75) Inventors: Martin Laermann, Clarkston, MI (US); Marek Tatur, Pleasant Ridge, MI (US); Harsha Nanjundaswamy, Auburn Hills, MI (US); Dean Tomazic, Orion Township, MI (US)

(73) Assignee: FEV GmbH, Aachen (DE)

( * ) Notice: Subject to any disclaimer, the term of this patent is extended or adjusted under 35 U.S.C. 154(b) by 360 days.

(21) Appl. No.: 12/558,855

(22) Filed: Sep. 14, 2009

(65) Prior Publication Data
US 2011/0061367 A1 Mar. 17, 2011

(51) Int. Cl.
*F01N 3/00* (2006.01)

(52) U.S. Cl.
USPC .................... 60/277; 60/274; 60/297

(58) Field of Classification Search
USPC ............... 60/278, 291, 297, 319, 273, 274, 60/287, 311
See application file for complete search history.

(56) References Cited

U.S. PATENT DOCUMENTS

| | | | |
|---|---|---|---|
| 4,515,758 A * | 5/1985 | Domesle et al. | 423/213.2 |
| 6,889,498 B1 | 5/2005 | Chandler et al. | |
| 7,866,146 B2 * | 1/2011 | Konstandopoulos | 60/311 |
| 2004/0006978 A1 * | 1/2004 | Beck et al. | 60/289 |
| 2007/0068149 A1 * | 3/2007 | Weber et al. | 60/312 |
| 2007/0214775 A1 | 9/2007 | I et al. | |
| 2008/0000218 A1 | 1/2008 | Handler et al. | |
| 2008/0098499 A1 * | 4/2008 | Oxborrow | D23/314 |
| 2008/0098724 A1 * | 5/2008 | Konstandopoulos | 60/278 |
| 2008/0105031 A1 | 5/2008 | Arlt et al. | |
| 2009/0241518 A1 * | 10/2009 | Weber et al. | 60/287 |
| 2010/0064686 A1 * | 3/2010 | Mondori | 60/605.2 |
| 2010/0199839 A1 * | 8/2010 | Zhang et al. | 95/23 |
| 2010/0242456 A1 * | 9/2010 | Konstandopoulos et al. | 60/311 |

FOREIGN PATENT DOCUMENTS

| | | |
|---|---|---|
| DE | 102005000978 | 7/2006 |
| DE | 102006019783 | 10/2007 |
| DE | 102006029990 | 1/2008 |
| DE | 102006048045 | 4/2008 |
| EP | 1060004 | 12/2000 |
| EP | 1849970 | 10/2007 |
| JP | 57212318 | 12/1982 |
| JP | 10-131740 | 5/1998 |
| WO | WO-2008/043422 | 4/2008 |

* cited by examiner

*Primary Examiner* — Kenneth Bomberg
*Assistant Examiner* — Jason Sheppard
(74) *Attorney, Agent, or Firm* — Gifford, Krass, Sprinkle, Anderson & Citkowski, P.C.; Thomas E. Anderson

(57) ABSTRACT

The present invention discloses an exhaust system for an internal combustion engine that provides diesel particulate filter (DPF) failure detection and/or monitoring of non-methane hydrocarbons (NMHC) for an internal combustion engine. The system can include a main exhaust duct and a secondary exhaust line operative for exhaust gas to pass therethrough. The system has an oxidation catalyst and a main particulate filter located in line with the main exhaust duct. A monitoring particulate filter is also included and located within the secondary exhaust line. The secondary exhaust line and the monitoring particulate filter are located downstream from the main particulate filter.

14 Claims, 4 Drawing Sheets

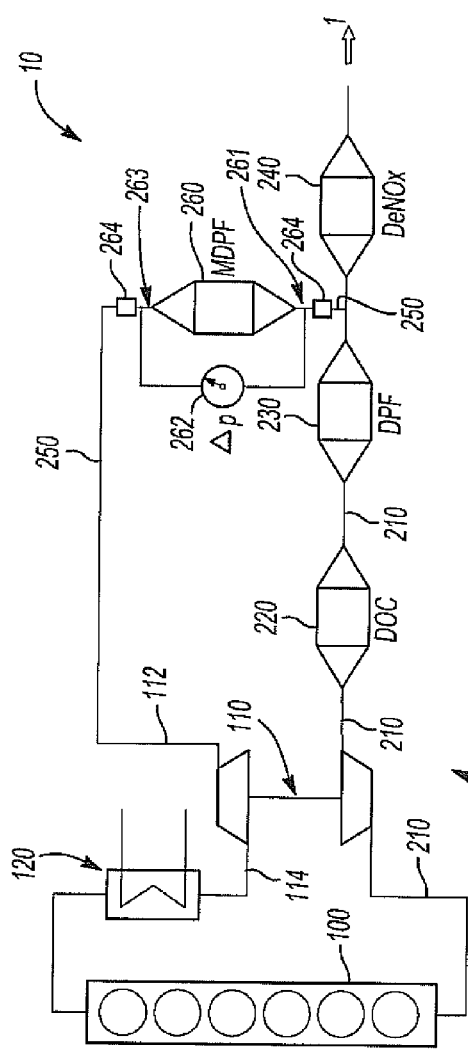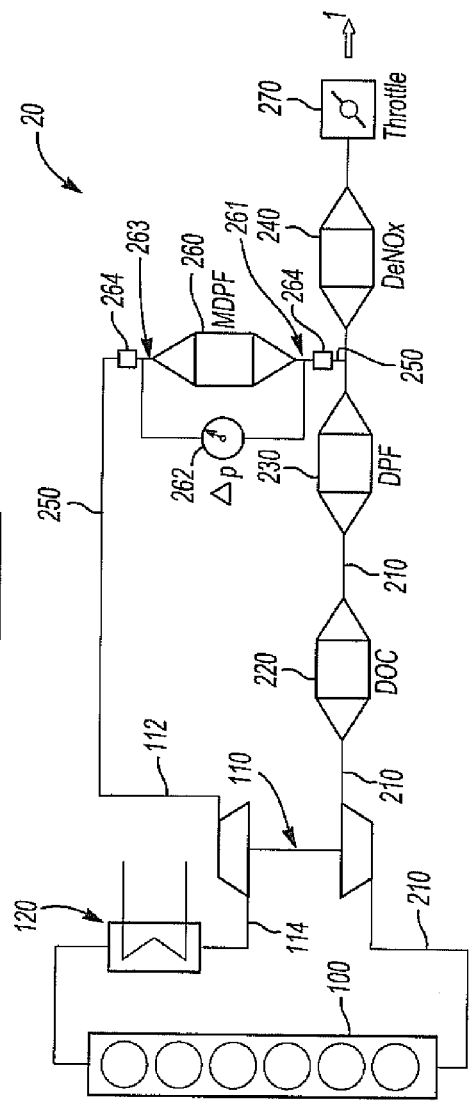

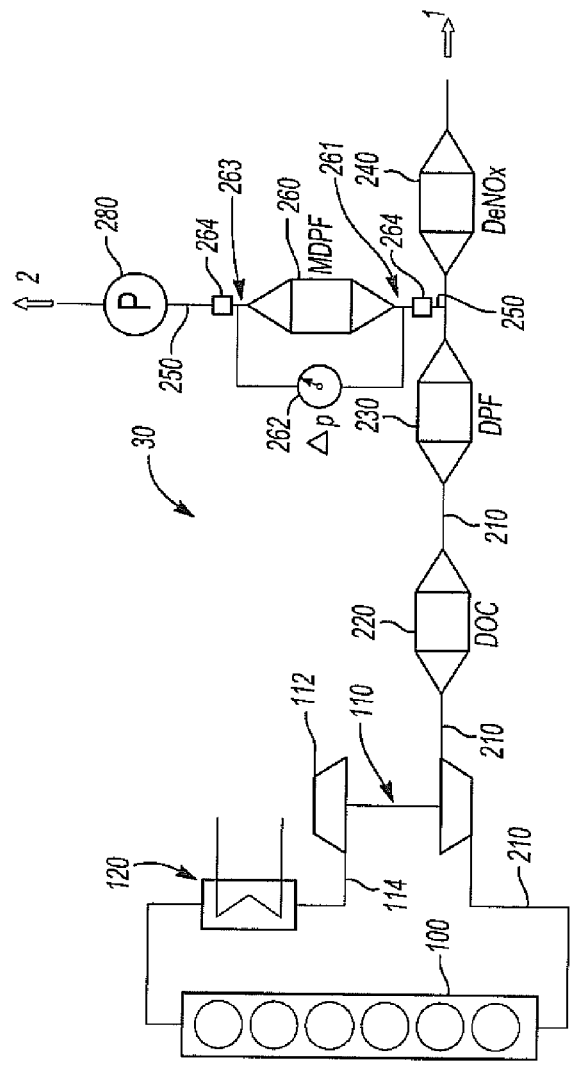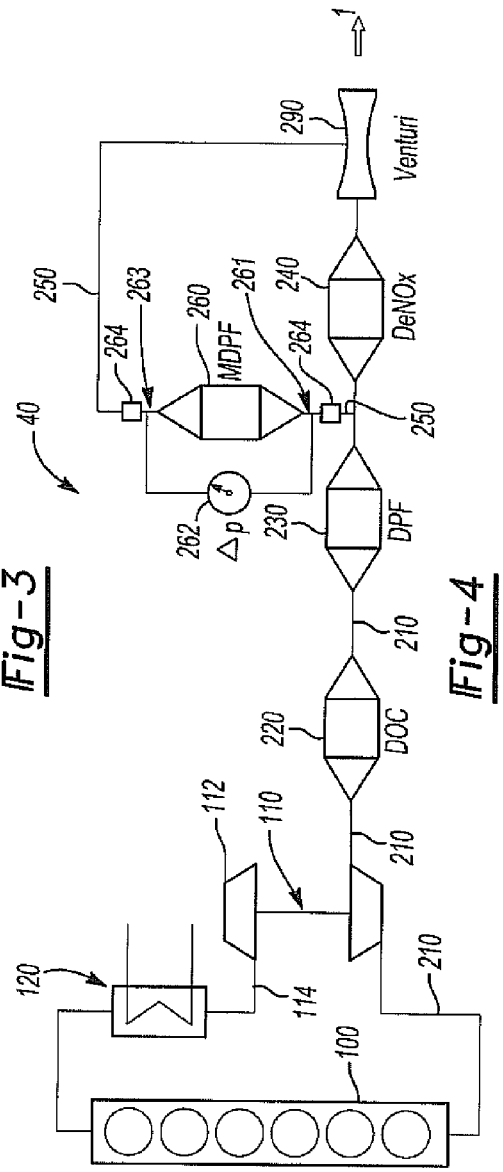

EXHAUST SYSTEM FOR INTERNAL COMBUSTION ENGINE

FIELD OF THE INVENTION

The present invention is related to an exhaust system for an internal combustion engine. In particular, the present invention is related to an exhaust system that monitors performance of a particulate filter and/or an oxidation catalyst.

BACKGROUND OF THE INVENTION

Legislation and statutory regulations require self-monitoring capabilities, for example onboard diagnosis, to monitor motor vehicle emissions of hydrocarbons, carbon monoxide, nitrogen oxides, particulates, and the like. In order to comply with such legal requirements, diagnosis functions are typically integrated within an engine management system for a motor vehicle internal combustion engine. Such management systems typically determine the ongoing performance of exhaust system components such as catalytic converters, nitrogen oxide catalysts, particulate filters and the like.

Currently available diagnostic systems for current and future exhaust aftertreatment systems have significant challenges in attempting to meet future/anticipated statutory emission standards. For example, future diagnostic requirements for diesel engines will require failure detection of a diesel particulate filter (DPF) with a particulate matter deterioration factor as low as 2.5. However, conventional measurement methodologies, for example differential pressure sensors, can only detect particulate matter deterioration factors between 10 to 20. As such, current particulate matter sensor technology does not provide an adequate solution for desired DPF failure detection.

The control and/or detection of non-methane hydrocarbons (NMHC) poses similar challenges to current technology. The detection of NMHC is currently afforded through indirect measurement since NMHC sensors are not available. As such, excessive NMHC emissions are typically tracked through intrusive tests which focus on the exothermic reaction generated during oxidation of the NMHC on a catalytic coating of a catalytic converter and/or DPF. Therefore, an exhaust system that provides for desired DPF failure detection and NMHC monitoring, and yet is simple in design, robust, etc., would be desirable.

SUMMARY OF THE INVENTION

The present invention discloses an exhaust system for an internal combustion engine that provides failure detection of a particulate filter and/or monitoring of non-methane hydrocarbons (NMHC) for an internal combustion engine. The exhaust system can include a main exhaust duct and a secondary exhaust line, both of which are operative for exhaust gas to pass therethrough. The system has an oxidation catalyst and a main particulate filter located within and/or inline with the main exhaust duct. A monitoring particulate filter is also included and located within and/or inline with the secondary exhaust line. All of the exhaust gas passing through the main exhaust duct passes through the main particulate filter and the secondary exhaust line and the monitoring particulate filter are located downstream from the main particulate filter.

A generally small portion of the exhaust gas passing through the main exhaust duct, and thus through the main particulate filter, can be used and/or directed to pass through the monitoring particulate filter. A pressure sensor operative to detect a change in pressure between an upstream side and a downstream side of the monitoring particulate filter, as well as a temperature sensor operative to detect a change in temperature between the upstream side and the downstream side of the monitoring particulate filter, can be included.

An increase in pressure across the monitoring particulate filter detected by the pressure sensor can indicate a decrease in performance and/or failure of the main particulate filter, while an increase in temperature detected by the temperature sensor can indicate a decrease in performance of the oxidation catalyst and/or an excess of NMHC passing through the oxidation catalyst.

With a generally small portion of exhaust gas passing through the monitoring particulate filter, a generally small particulate filter can be used to monitor the main particulate filter. It is appreciated that a generally small monitoring particulate filter can reduce the cost associated with an exhaust system that monitors performance of a particulate filter and/or an oxidation catalyst. In addition, a generally small monitoring particulate filter can have a heavy catalyst loading without a large increase in cost. In this manner, a monitoring particulate filter with a large catalyst loading can be used to oxidize NMHC passing therethrough, the oxidation of the NMHC affording for an increase in temperature which can be detected by the temperature sensor.

In the event that the main particulate filter fails and/or starts to fail, and particulates pass therethrough, at least part of the particulates that have passed through the main particulate filter can enter the monitoring particulate filter. The increase of particulate loading in the monitoring particulate filter can result in an increase in pressure between the upstream side and the downstream side of the filter. In addition, the increase in pressure can be monitored and/or detected and used to alert an operator, driver, service person, etc, of the failure and/or potential failure of the main particulate filter. In a like manner, an increase in NMHC passing through the monitoring particulate filter can result in an increase in the oxidation thereof and thus an increase in temperature of the filter. The increase in temperature can also be used to determine the ongoing performance of the oxidation catalyst, the internal combustion engine and the like.

In some instances, a pump in fluid communication with the secondary exhaust line can be included and be operative to force exhaust gas through the monitoring particulate filter at a generally constant flow rate. It is appreciated that a generally constant flow rate can afford a decrease in catalyst loading of the monitoring particulate filter since the oxidation of NMHC passing therethrough can be controlled with greater accuracy than for NMHC passing through the filter at a generally non-constant flow rate. In the alternative to a pump, a venturi can also be in fluid communication with the secondary exhaust line and be operative to pull exhaust gas through the monitoring particulate filter at a generally constant flow rate.

It is appreciated that one or more mixing devices can be located downstream from the main particulate filter and upstream from the secondary exhaust line in order to ensure a representative sampling of exhaust gas passing through the main particulate filter flows into the monitoring particulate filter. In some instances, less than 25% of the exhaust gas that passes through the main particulate filter enters and flows through the secondary exhaust line and the monitoring particulate filter. In other instances, less than 10%, and in still other instances less than 5%, of the exhaust gas that passes through the main particulate filter enters and flows through the monitoring particulate filter.

A process for monitoring an exhaust system of an internal combustion engine is also disclosed. The process includes providing exhaust ducting operative for exhaust gas to flow therethrough from the internal combustion engine to a pressure sink. The exhaust ducting can have a main exhaust duct and a secondary exhaust line and a main particulate filter can be located within and/or inline the main exhaust duct between the engine and the pressure sink. A monitoring particulate filter can be provided and located within and/or inline with the secondary exhaust line and the secondary exhaust line with the monitoring particulate filter can be located downstream of the main particulate filter. A pressure sensor operative to detect a change in pressure between an upstream side and a downstream side of the monitoring particulate filter can be included and used to detect a change in pressure across the monitoring particulate filter. As stated above, an increase in pressure across the monitoring particulate filter can be the result of a failing and/or failed main particulate filter. A temperature sensor can also be provided and be operative to detect a change in temperature across the monitoring particulate filter.

Upon operation of the internal combustion engine, exhaust gas can flow through the exhaust ducting from the engine, through the main particulate filter to the pressure sink. A portion of the exhaust gas passing through the main particulate filter can flow through the secondary exhaust line and thus into the monitoring particulate filter. As such, pressure and temperature changes across the monitoring particulate filter can be detected and/or monitored and thereby provide information on the performance of the main particulate filter and oxidation catalyst, respectively, located upstream from the monitoring particulate filter.

BRIEF DESCRIPTION OF THE DRAWINGS

FIG. 1 is a schematic diagram representing an internal combustion engine having an exhaust system according to an embodiment of the present invention;

FIG. 2 is a schematic diagram representing another embodiment of the present invention;

FIG. 3 is a schematic diagram representing another embodiment of the present invention;

FIG. 4 is a schematic diagram representing another embodiment of the present invention;

DETAILED DESCRIPTION OF THE INVENTION

Figure 5:
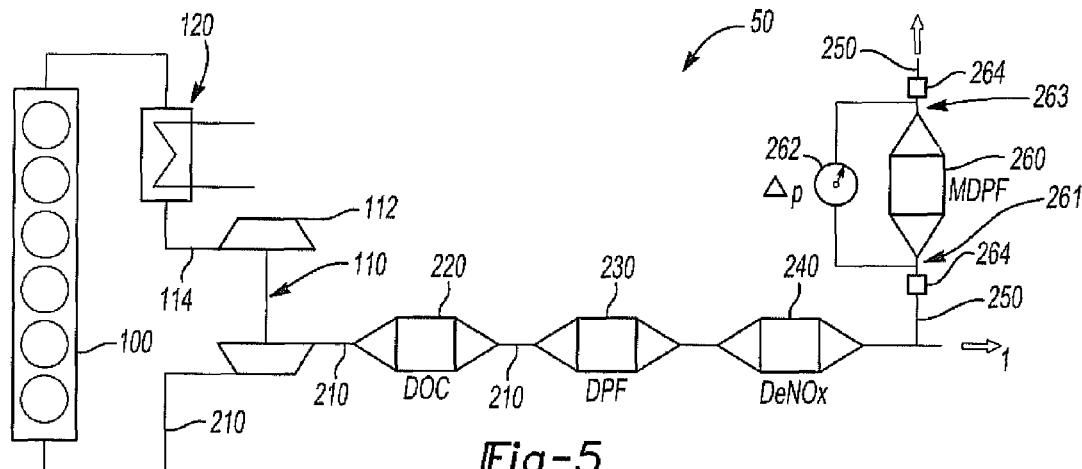
FIG. 5 is a schematic diagram representing another embodiment of the present invention.

The present invention discloses an exhaust system and a process operative to monitor a particulate filter located within and/or inline a main exhaust duct. As such, the exhaust system and process have utility for providing exhaust gas aftertreatment.

The exhaust system includes a main exhaust duct and a secondary exhaust line, both of which are operative for exhaust gas to pass therethrough. An oxidation catalyst and/or a main particulate filter can be located within and/or inline with the main exhaust duct. A monitoring particulate filter can be located within and/or inline the secondary exhaust line. In addition, the secondary exhaust line and the monitoring particulate filter can be located downstream from the main particulate filter and at least a portion of the exhaust gas that passes through the main particulate filter can pass through the secondary exhaust line and the monitoring particulate filter. It is appreciated that the term "inline" refers to a component, for example the main particulate filer, oxidation catalyst, monitoring particulate filer, etc., being in fluid communication with the main exhaust duct or secondary exhaust line without a bypass being present around the component.

A pressure sensor that is operative to detect a change in pressure between an upstream side and a downstream side of the monitoring particulate filter affords for monitoring of the pressure across the filter. In addition, a temperature sensor is provided that can detect a change in temperature between the upstream side and the downstream side of the monitoring particulate filter.

In the event that the main particulate filter starts to fail and/or fails such that excess particulates pass therethrough, at least a portion of the particulates can enter the monitoring particulate filter located downstream from the main particulate filter and afford a pressure increase across the monitoring particulate filer. In addition, initiation and/or total failure of the oxidation catalysts can afford an increase of nonmethane hydrocarbons (NMHC) passing therethrough, and thus a corresponding increase in temperature across the monitoring particulate filter can occur when excess NMHC is oxidized therewithin. It is appreciated that the monitoring particulate filter can have a catalyst loading therewithin for the oxidation of the NMHC, the oxidation affording an increase in temperature. In addition, the catalyst loading of the monitoring particulate filter can be greater than catalyst loading of the oxidation catalyst, thereby ensuring the oxidation of excess NMHC passing through the monitoring particulate filter. For example, the catalyst loading of the monitoring particulate filter can be greater than 20% of the catalyst loading of the oxidation catalyst, and yet with the reduced size of the monitoring particulate filter, a significant increase in cost is avoided.

The exhaust system can also include a pump that is in fluid communication with the secondary exhaust line and is operative to force exhaust gas through the monitoring particulate filter at a generally constant flow rate. In the alternative, a venturi can be in fluid communication with the secondary exhaust line in order to pull exhaust gas through the monitoring particulate filter at a generally constant flow rate. In some instances, one or more mixing devices can be located downstream from the main particulate filter and upstream from the secondary exhaust line in order to ensure that a representative sample of the exhaust gas passing through the main particulate filter enters into the secondary exhaust line and thus into the monitoring particulate filter.

A generally small portion of the exhaust gas that passes through the main particulate filter can be used to pass through the monitoring particulate filter. In some instances, less than 25% of the exhaust gas that passes through the main particulate filter can be used to enter and flow through the secondary exhaust line and thus pass through the monitoring particulate filter. In other instances, less than 10%, and in still yet other instances less than 5%, of the exhaust gas that passes through the main particulate filter can be used to enter and flow through the secondary exhaust line and the monitoring particulate filter. In this manner, a relatively small particulate filter can be used to monitor the performance of the main particulate filter and/or the oxidation catalyst.

A process for monitoring the exhaust system and exhaust gas of the internal combustion engine can include providing exhaust ducting that is operative for exhaust gas to flow therethrough from the internal combustion engine to a pressure sink. The exhaust ducting can have a main exhaust duct and a secondary exhaust line that is in fluid communication with the main exhaust duct. An oxidation catalyst, main particulate filter, and the like can be provided as described above and located within and/or inline with the main exhaust duct. In addition, a monitoring particulate filter can be located within and/or inline with the secondary exhaust line. A pressure sensor and a temperature sensor that are operative to detect a change in pressure and temperature, respectively, across the monitoring particulate filter are also provided as part of the process.

Upon operation of the internal combustion engine, exhaust gas can flow through the exhaust ducting from the engine, through the main particulate filter, to the pressure sink. A portion of the exhaust gas flowing through the main particulate filter can pass or flow into the secondary exhaust line and thus into the monitoring particulate filter. Monitoring of the pressure sensor and/or temperature sensor can provide information as to when there is an increase in pressure and/or an increase in temperature across the main particulate filter and oxidation catalyst, respectively. It is appreciated that an increase in pressure and/or temperature can be used as an alert for the initiation and/or complete failure of the main particulate filter and/or oxidation catalyst, respectively.

The system and the process afford for all of the exhaust gas in the main exhaust duct to pass through the main particulate filter. Stated differently, there is no bypass around the main particulate filter for any of the exhaust gas to pass through. In addition, the system and the process are simple in design, robust, and can use well-known components that have been certified for vehicle lifetime operation, and thus do not require additional and/or new certification. It is appreciated that such a system and process can be easy to retrofit to existing internal combustion engines. In some instances, the internal combustion engine is a diesel engine and the oxidation catalyst is a diesel oxidation catalyst (DOC), the particulate filter is a diesel particulate filter (DPF), and the like.

Turning now to FIG. 1, an embodiment of an exhaust system is shown generally at reference numeral 10. The exhaust system 10 can include exhaust ducting 200 in fluid communication with an internal combustion engine 100. In some instances, the internal combustion engine 100 can be a diesel engine with a turbocharger 110 and an intercooler 120. The turbocharger 110 can have a low pressure inlet 112 and a high pressure outlet 114.

The exhaust ducting 200 can have a main exhaust duct 210, a diesel oxidation catalyst (DOC) 220, a diesel particulate filter (DPF) 230 and a nitrogen oxide catalyst (DeNOx) 240. It is appreciated that exhaust gas exits the engine 100 through the main exhaust duct 210 and flows or travels to a pressure sink 1. At a location between the DPF 230 and the pressure sink 1, a secondary exhaust line 250 can be located, the secondary exhaust line 250 in fluid communication with the main exhaust duct 210. Within and/or inline with the secondary exhaust line 250 is a monitoring diesel particulate filter (MDPF) 260.

In some instances, a pressure sensor 262 can be included that affords for the detection and monitoring of a pressure difference across the MDPF 260. For example, a pressure sensor 262 can be located on an upstream side 261 and another pressure sensor 262 can be located on a downstream side 263. In the alternative, if a pressure on the upstream side 261 is generally known and/or is generally constant, a single pressure sensor 262 can be located on the downstream side 263 and used to monitor a pressure change across the MDPF 260. In another alternative, if a pressure on the downstream side 263 is generally known and/or is generally constant, a single pressure sensor 262 can be located on the upstream side 261 and used to monitor a change in pressure across the MDPF 260. It is appreciated that such alternatives are different examples, embodiments, etc., that afford for a pressure change to be detected and/or monitored across the MDPF 260, e.g. when an increase of particulate matter passes or flows into the MDPF 260. It is further appreciated that a pressure monitor that can calculate and/or determine an increase in pressure between the upstream side 261 and the downstream side 263 using the one or more pressure sensors 262 can be included.

In some instances, a temperature sensor 264 can be included that affords for the detection and monitoring of a temperature difference across the MDPF 260. For example, a temperature sensor 264 can be located on the upstream side 261 and another temperature sensor 264 can be located on the downstream side 263. In the alternative, if a temperature on the upstream side 261 is generally known and/or is generally constant, a single temperature sensor 264 can be located on the downstream side 263 and used to monitor a temperature change across the MDPF 260. In another alternative, if a temperature on the downstream side 263 is generally known and/or is generally constant, a temperature sensor 264 can be located on the upstream side 261 and used to monitor a change in temperature across the MDPF 260. It is appreciated that such alternatives are different examples, embodiments, etc, that afford for a temperature change to be detected and/or monitored across the MDPF 260 when an increase of hydrocarbons passes thereinto. It is further appreciated that a temperature monitor that can calculate and/or determine an increase in temperature between the upstream side 261 and the downstream side 263 using the one or more temperature sensors 264 can be included.

During operation of the internal combustion engine 100, exhaust gas exits therefrom and flows through the main exhaust duct 210, through the DOC 220, DPF 230, and DeNOx 240. At least part of the exhaust gas can be diverted to flow into the secondary exhaust line 250 and thus through the MDPF 260. In the event that the DOC 220 is not operating properly and/or excessive hydrocarbons, for example NMHC, pass through the DOC 220, at least a portion thereof can pass or flow into the secondary exhaust line 250 and the MDPF 260. The MDPF 260 can have catalyst loading therewithin that affords for the oxidation of the NMHC, thereby producing a corresponding increase in the temperature of the MDPF 260. It is appreciated that the increase in temperature of the MDPF 260 can be detected and/or monitored and used as an alert related to the operation of the DOC 220. In this manner, the performance of the DOC 220 can be monitored.

In the event that the DPF 230 begins to diminish in its performance, e.g. starts to fail or does fail, diesel particulates will exit the DPF 230 and a portion thereof can pass or flow into the secondary exhaust line 250 and thus the MDPF 260. Upon entering the MDPF 260, a pressure increase across the filter can occur and be detected by the pressure sensor 262. In this manner, performance of the DPF 230 can be detected and monitored. It is appreciated that the secondary exhaust line 250 can extend from the MDPF 260 to the low pressure inlet 112 of the turbocharger 110 as shown in FIG. 1.

Turning now to FIG. 2 where like numerals represent like components as described above, an embodiment 20 is shown with a throttle 270 in line with the main exhaust duct 210.

FIG. 3 illustrates an embodiment 30 with a pump 280 located downstream from the MDPF 260 and in fluid communication with the secondary exhaust line 250. It is appreciated that the pump 280 can force exhaust gas through the MDPF 260 at a generally constant flow rate. Although the pump 280 is shown downstream from the MDPF 260 in this figure, it is appreciated that a pump can be located upstream of the MDPF 260. It is further appreciated that with a constant flow rate of exhaust gas through the MDPF 260, oxidation of excess hydrocarbons passing into the MDPF 260 can be provided with less catalyst loading of the filter 260.

Instead of using a pump 280, a venturi 290 can be in fluid communication with the MDPF 260 as shown in embodiment 40 illustrated in FIG. 4. In this manner, the venturi 290 can pull exhaust gas through the MDPF 260 at a generally constant flow rate and allow for less catalyst loading of the filter 260 as taught above.

Turning now to FIG. 5, an embodiment 50 illustrates that exhaust gas passing through the MDPF 260 is not required to pass through the turbocharger 110 and/or a component located downstream from the DPF 230 and inline with the main exhaust duct 210. For example, the exhaust gas passing through the MDPF 260 could be exited to the atmosphere, returned to the main exhaust line 210 and the like.

Figure 6:
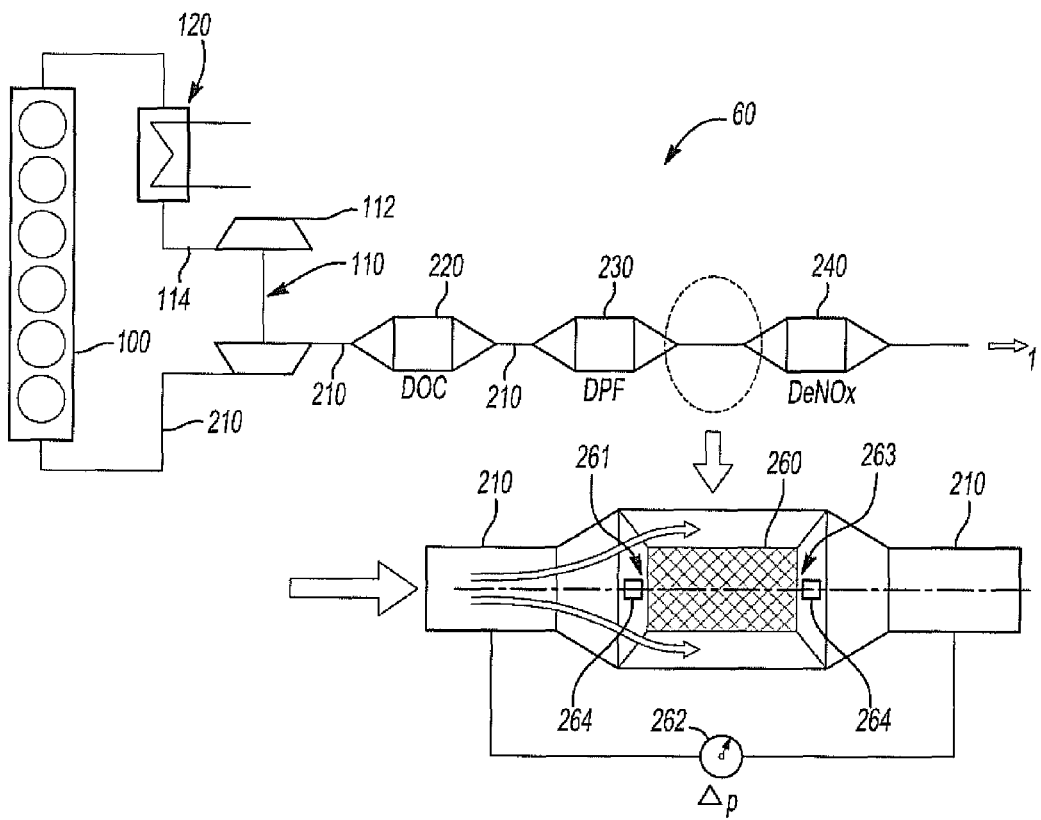
FIG. 6 is a schematic diagram representing another embodiment of the present invention.

Referring now to FIG. 6, an embodiment 60 illustrates that the MDPF 260 can be located inside the main exhaust duct 210. The embodiment 60 affords for a portion of the exhaust gas that has passed through the DPF 230 to bypass the MDPF 260 and a portion of the exhaust gas to flow into the MDPF 260. It is appreciated that although the MDPF 260 is located within the main exhaust duct 210, the pressure sensor 262, and the temperature sensor 264 can still provide a change in pressure and temperature, respectively, across the filter and thus afford for monitoring of the performance of the DOC 220 and the DPF 230 as taught above.

Figure 7:
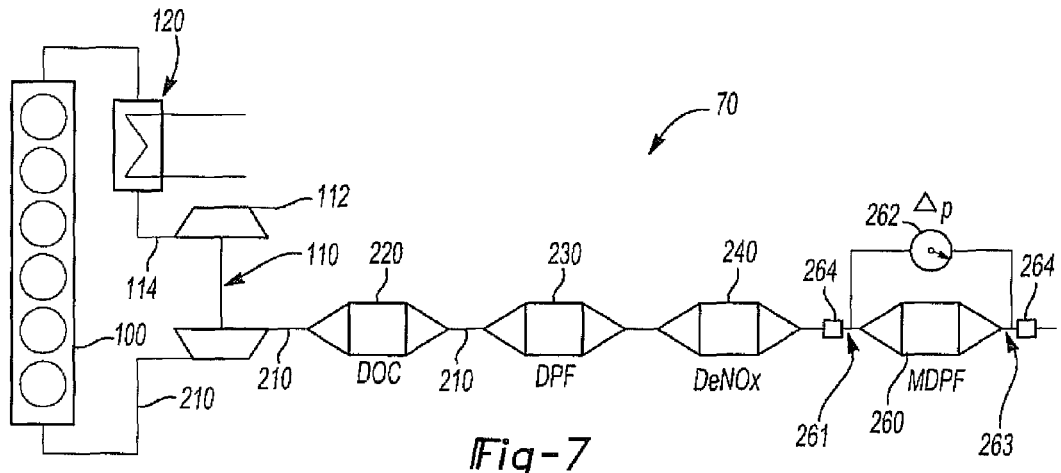
FIG. 7 is a schematic diagram representing another embodiment of the present invention.
Figure 8:
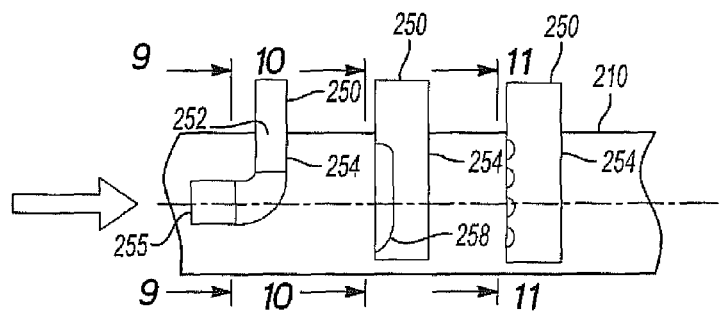
FIG. 8 is a schematic diagram representing three possible embodiments for taking a portion of an exhaust gas from a main exhaust duct and passing it into a secondary exhaust line.

An embodiment 70 of an exhaust system is shown in FIG. 7 where the MDPF 260 is located downstream from the DeNOx 240. It is appreciated that although the MDPF 260 shown in this figure is in line with the main exhaust duct 210, this is not required. For example, the embodiments shown in FIGS. 1-6 could have the MDPF 260 located downstream from the DeNOx 240. In addition, it is appreciated that the exact order of the DOC 220, DPF 230, and DeNOx 240 with respect to their position along the main exhaust line 210 can be different than illustrated in the figures. For example, the DeNOx 240 could be located downstream of the MDPF 260.

Figure 9:
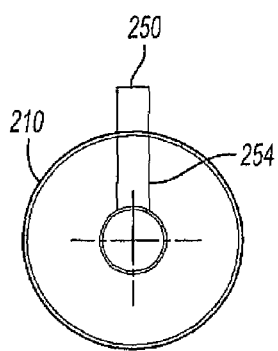
FIG. 9 is an end cross-sectional view of the section labeled 9-9 in FIG. 8.
Figure 10:
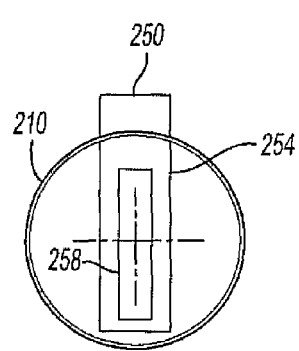
FIG. 10 is an end cross-sectional view of the section labeled 10-10 in FIG. 8.
Figure 11:
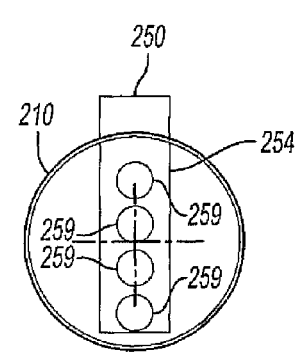
FIG. 11 is an end cross-sectional view of the area labeled 11-11 in FIG. 8.

Referring now to FIGS. 8-11, three separate examples of the secondary exhaust line 250 in fluid communication with the main exhaust line 210 are shown. As shown in FIG. 9, the secondary exhaust line 250 can have an inlet portion 254 that is located at least partially within the main exhaust duct 210. The inlet portion 254 can have a bend such that an inlet end 255 faces upstream and thus affords for a portion of the exhaust gas that has passed through the DPF 230 to enter into the secondary exhaust line 250. With respect to FIG. 10, the secondary exhaust line 250 can have an inlet portion 254 that has a slot 258 in the wall thereof. In this manner, the slot 258 can be arranged such that it faces upstream. With respect to FIG. 11, the secondary exhaust line 250 can have an inlet portion 254 with one or more apertures 259 that can face upstream and allow exhaust gas to flow into the secondary exhaust line 250.

It is appreciated that a valve (not shown) can be included at least partially within the secondary exhaust line 250 upstream of the MDPF 260. The valve can terminate or stop any flow of the exhaust gas that has passed through the DPF 230 from passing through the MDPF 260. In this manner, when the DPF 230 is exposed to a high stress, for example during regeneration, the MDPF 260 can be deactivated in order to avoid failure thereof. In addition, once a DPF 230 is known to fail, the MDPF 260 could be deactivated such that it will not fail also.

It is appreciated that since the MDPF 260 does not have all of the exhaust gas flowing through the main exhaust duct 210 passing therethrough, it can be significantly smaller in size than the MPF 230. In addition, due to its smaller size, a high loading of active metal, for example platinum, palladium, and the like, can be provided and yet remain cost effective. For example and for illustrative purposes only, the MDPF 260 can have a catalyst loading in the range of 75 to 150 g/ft$^3$, for example 100 g/ft$^3$, whereas a typical catalyst loading for the DPF 230 can be generally 50 g/ft$^3$. If the MDPF 260 is driven without a throttle valve, it is appreciated that the MDPF 260 will not increase any back pressure to the system. As such, the design of the MDPF 260 can be adjusted to exhibit good filtering and pressure change detection since a generally low pressure change can be detected across the filter.

It is further appreciated that one or more mixing devices (not shown) can be located upstream from the secondary exhaust line 250 such that exhaust gas passing through the DPF 230 is properly mixed before passing or flowing into the MDPF 260. Such a mixing device can include a fixed vane, a swirled vane, and the like, the mixing device located and optionally rigidly attached to an interior wall of the main exhaust duct 210.

During operation, a portion of the exhaust gas passing through the DPF 230 is diverted from the main exhaust duct 210 and into the secondary exhaust line 250. The exhaust gas flowing into the secondary exhaust line 250 can then pass or enter into the MDPF 260. In the event that excess particulate matter passes into the MDPF 260, a pressure increase can occur between the upstream side and the downstream side thereof. The pressure increase can be detected by the pressure sensor 262 and used to alert an onboard diagnostic system that excess particulate matter is exiting the DPF 230 and thus provide a warning that the DPF 230 is failing or has already failed. In a like manner, the catalyst loading of the MDPF 260 can oxidize hydrocarbons passing therethrough and result in an increase in temperature from the upstream side to the downstream side. The change in temperature can be detected by one or more temperature sensors 264. In this manner, an increase in temperature across the MDPF 260 can provide information to the onboard diagnostic system that the DOC 220 is failing and/or has already failed.

The components of the MDPF 260, pressure sensor 262, temperature sensor 264, and secondary exhaust line 250 can be components that are currently available on the market. In addition, such components can have existing vehicle life certification such that recertification of the system and/or process is not required. Therefore, the system and/or process is appreciated to be useful for retrofitting of existing systems and for use with new systems.

It is to be understood that various modifications are readily made to the embodiments of the present invention described herein without departing from the scope and spirit thereof. Methods, apparatus, compositions, systems, and the like described herein are exemplary and not intended as limitations on the scope of the invention. Changes therein and other uses will occur to those skilled in the art. The scope of the invention is defined by the scope of the claims.

We claim:

1. An exhaust system for an internal combustion engine, said exhaust system comprising:
    a main exhaust duct and a secondary exhaust line operative for exhaust gas to pass therethrough;
    an oxidation catalyst located inline with said main exhaust duct;
    a main particulate filter located inline with said main exhaust duct with all of the exhaust gas passing through said main exhaust duct also passing through said main particulate filter;
    a catalytic monitoring filter located within said secondary exhaust line, said secondary exhaust line and said catalytic monitoring filter located downstream from said main particulate filter, said catalytic monitoring filter being smaller than said main particulate filter;
    a pressure sensor operative to detect an increase in pressure across said catalytic monitoring filter; and
    a temperature sensor operative to detect an increase in temperature across said catalytic monitoring filter;
    said catalytic monitoring filter monitoring said main particulate filter with a detected increase in pressure across said catalytic monitoring filter used to alert at least one of an operator, driver and service person of a failure or potential failure of said main particulate filter;
    said catalytic monitoring filter also monitoring said oxidation catalyst with a detected increase in temperature across said catalytic monitoring filter used to alert at least one of an operator, driver and service person of a failure or potential failure of said oxidation catalyst.

2. The exhaust system of claim 1, wherein said monitoring particulate filter and said oxidation catalyst each have a catalyst loading, said catalyst loading of said monitoring particulate filter more than 20% greater than said catalyst loading of said oxidation catalyst.

3. The exhaust system of claim 1, further comprising a pump in fluid communication with said secondary exhaust line and operative to force exhaust gas through said monitoring particulate filter at a constant flow rate.

4. The exhaust system of claim 1, further comprising a venturi in fluid communication with said secondary exhaust line and operative to pull exhaust gas through said monitoring particulate filter at a constant flow rate.

5. The exhaust system of claim 1, further comprising a mixing device located downstream said main particulate filter and upstream said secondary exhaust line in fluid communication with said main exhaust duct.

6. The exhaust system of claim 1, wherein less than 25% of the exhaust gas that passes through said main particulate filter enters and flows through said secondary exhaust line and passes through said monitoring particulate filter.

7. The exhaust system of claim 1, wherein less than 10% of the exhaust gas that passes through said main particulate filter enters and flows through said secondary exhaust line and passes through said monitoring particulate filter.

8. The exhaust system of claim 1, wherein less than 5% of the exhaust gas that passes through said main particulate filter enters and flows through said secondary exhaust line and passes through said monitoring particulate filter.

9. A process for monitoring an exhaust system of an internal combustion engine, the process comprising:
    flowing exhaust gas from the internal combustion engine through a main exhaust duct having a main particulate filter and an oxidation catalyst located inline therewith,
    flowing a portion of the exhaust gas from the main exhaust duct through a secondary exhaust line having a catalytic monitoring filter located inline therewith and in fluid communication with the main exhaust duct, the secondary exhaust line and catalytic monitoring filter located downstream from the main particulate filter and the oxidation catalyst;
    detecting at least one of an increase in pressure across the catalytic monitoring filter with a pressure sensor and an increase in temperature across the catalytic monitoring filter with a temperature sensor; and
    monitoring the exhaust system with a detected increase in pressure across the catalytic monitoring filter used to alert at least one of an operator, driver and service person of a failure or potential failure of the main particulate filter and a detected increase in temperature across the catalytic monitoring filter used to alert at least one of an operator, driver and service person of a failure or potential failure of the oxidation catalyst.

10. The process of claim 9, wherein the portion of the exhaust gas passing through the secondary exhaust line is less than 25% of the exhaust gas flowing through the main particulate filter.

11. The process of claim 9, wherein the portion of the exhaust gas passing through the secondary exhaust line is less than 10% of the exhaust gas flowing through the main particulate filter.

12. The process of claim 9, wherein the portion of the exhaust gas passing through the secondary exhaust line is less than 5% of the exhaust gas flowing through the main particulate filter.

13. The process of claim 9, further comprising providing a pump in fluid communication with the secondary exhaust line and operative to force exhaust gas through the monitoring particulate filter at a constant flow rate.

14. The process of claim 9, further comprising providing a venturi in fluid communication with the secondary exhaust line and operative to pull exhaust gas through the monitoring particulate filter at a constant flow rate.

* * * * *